ns Patent Office
3,536,525
Patented Oct. 27, 1970

3,536,525
METAL SURFACE BONDED WITH A CROSS-LINKED COPOLYMER
Günter Kolb, Cologne-Stammheim, Erwin Alfons Müller, Blecher Erberich, and Rudolf Wüst, Cologne-Mulheim, Germany, assignors to Farbenfabriken Bayer Aktiengesellschaft, Leverkusen, Germany, a corporation of Germany
No Drawing. Filed Apr. 18, 1967, Ser. No. 631,600
Claims priority, application Germany, June 14, 1966, F 49,459
Int. Cl. B44d *1/36;* B32b *15/08*
U.S. Cl. 117—132         7 Claims

ABSTRACT OF THE DISCLOSURE

A metal surface bonded with a cross-linked copolymer consisting essentially of (a) 0.1 to 50% by weight, based on the total monomers, of at least one monomer of the formula

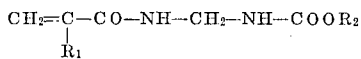

wherein $R_1$ is hydrogen or methyl and $R_2$ is alkyl, cycloalkyl, aryl or aralkyl; (b) at least 25% by weight, based on the total monomers, of at least one monomer with elasticizing action which is a conjugated 1,3-diolefin or an ester of acrylic or methacrylic acid with an alcohol and (c) 0 to 70% by weight, based on the total monomer, of at least one further monomer capable of polymerizing with monomers (a) and (b).

This invention relates to metal coatings and a process for producing metal coatings by treating metal surfaces with aqueous copolymer emulsions.

It is known that metal surfaces can be treated with aqueous or organic solutions or emulsions of polymers with a view to providing protective coatings. Unfortunately, these conventional processes have the disadvantage that before the coatings can be further processed, for example mixed with different or similar lacquer systems to form a multi-layer lacquer, or wet ground, they must be stoved for long periods at elevated temperatures. A further disadvantage is that it is necessary to keep within a specified pH-range during preparation of the coatings, which is often technically impossible.

It is an object of the present invention to provide metal coatings and a process for their production which do not shown the above mentioned disadvantages.

It is a further object to obtain metal coatings which are cross-linked, absolutely weather-resistant and do not yellow and which have despite their extreme hardness a good toughness and elasticity.

Another object will come apparent from the disclosure.

Accordingly, the present invention relates to a process for producing metal coatings by treating metal surfaces with treatment of finishing agents comprising aqueous emulsions of copolymers which contain the repeating group

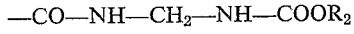

where $R_2$ represents an alkyl, cycloalkyl, aryl, or aralkyl radical.

It has been found that emulsions of copolymers containing 0.1 to 50% by weight, based on total monomer, of units derived from at least one compound corresponding to Formula I

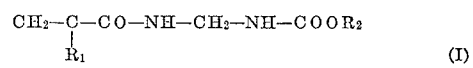

in which $R_1$ and $R_2$ represent alkyl, cycloalkyl, aralkyl or aryl, and $R_1$ may in addition represent hydrogen, are particularly suitable for the process according to the invention. Preferred are alkyl radicals having 1 to 6 carbon atoms, cycloalkyl radical having 5 to 7 carbon atoms, phenyl alkyl radicals having 6 carbon atoms in the aryl part and 1 to 3 carbon atoms in the alkyl part, phenyl and naphthyl radicals.

In a preferred embodiment, emulsions of copolymers contain 1 to 20% by weight of units derived from the monomers of Formula I, are used.

Compounds of general Formula I, whose preparation is described in German patent specification No. 1,195,739, and which are used in the preparation of the copolymers to be used in accordance with the invention, include for example acrylamidomethylene-carbamic acid methyl ester, ethyl ester and butyl ester; and methacrylamido-methylene-carbamic acid methyl ester, ethyl ester, cyclohexyl ester, benzyl ester or phenyl ester. Of particular importance in this connection are amidomethylene-carbamic acid esters of acrylic and methacrylic acid, which as the alcohol moiety contain the radical of a saturated monohydric alcohol with 1 to 6 carbon atoms.

Suitable comonomer components with elasticising properties include aliphatically-conjugated diolefins having 4 to 6 carbon atoms, acrylic esters with 1 to 18 carbon atoms in the alcohol moiety and methacrylic esters containing 4 to 18 carbon atoms in the alcohol moiety, for example 1,3-butadiene; 2-methyl-1,3-butadiene; 2-chloro-1,3-butadiene; 2,3-dimethyl-1,3-butadiene; methyl acrylate; ethyl acrylate, isopropyl acrylate; butyl acrylate; 2-ethylhexyl acrylate, decyl acrylate, octadecyl acrylate; butylmethacrylate; 2 - ethylhexylmethacrylate; dodecyl methacrylate and octadecyl methacrylate.

These elasticising monomer components or mixtures thereof are used in quantities of at least 25% by weight, based on total monomer. The conjugated aliphatic diolefins are preferably used in quantities from 35–45% by weight, based on total monomer, the elasticising monomers from the acrylate group in quantities from 45 to 60% by weight and those from the methacrylate group in quantities from 45 to 80% by weight, based on total monomer.

Other radically-copolymerisable monomers containing double bonds, or mixtures thereof, may also be used in the preparation of the copolymer emulsions used in accordance with the invention. Examples of such monomers include methacrylic esters with lower alcohol radicals (i.e. alcohols with 1 to 3 carbon atoms) such as methyl methacrylate or ethyl methacrylate; vinyl esters such as vinyl acetate, propionate or benzoate; vinyl ethers such as vinyl-n-butyl ether; unsaturated hydrocarbons such as ethylene and propylene; unsaturated halogenated hydrocarbons such as vinyl chloride or 1,1-dichloroethane; aromatic vinyl compounds such as styrene, α-methyl styrene or vinyl toluene; α,β-unsaturated carboxylic acids, such as acrylic acid, methacrylic acid and their derivatives such as acrylamide, methacrylamide, acrylonitrile, 2-hydroxyethyl methacrylate, 2-hydroxypropyl acrylate, 2-aminoethyl metharyclate hydrochloride and 2-dimethylaminomethacrylate; and 2-vinyl pyridine.

The aforementioned monomers or mixtures thereof may be used in quantities from 0 to 70% by weight, based on total monomer. Of particular interest among the aforementioned monomers are styrene, acrylonitrile, methyl methacrylate, vinyl acetate, acrylamide, methacrylamide, acrylic acid, methacrylic acid and mixtures thereof.

The copolymer emulsions are prepared by known processes in which the monomers referred to are polymerised either in suspension or in emulsion by means of conventional polymerisation catalysts which form free radicals. The monomers may also be copolymerised in bulk or in solution and converted into emulsions following copolymerisation. Copolymerisation in aqueous emulsion at pH-values below 7 and at temperatures not too far above 50° C. has proved to be particularly effective.

Anionic, cationic ar non-ionic emulsifiers may be used. It has proved to be of particular advantage to use the emulsifiers in extremely small quantities, preferably in quantities of less than 1% by weight, based on total monomer.

Preferred emulsifiers are fatty acid sulphates and/or fatty acid sulphonates or their ammonium of alkalimetal salts. The fatty acids on which the emulsifiers are based preferably contain 8 to 20 carbon atoms.

It is readily possible (and is covered by the definition of copolymerisation) to prepare the polymers by graft copolymerisation or by block copolymerisation, in which case one or more of the monomers is initially polymerised and one or more of the residual monomers polymerised to completion with the resulting prepolymer.

Metal surfaces include the surfaces of any mouldings of metal such as iron, steel, nickel, cobalt, chromium, zinc, copper, aluminium, magnesium, tin, tungsten, titanium, tantalum, vanadium, molybdenum or alloys thereof.

The usual auxiliaries may of course be added to the aqueous copolymer emulsions according to the invention. Examples of such auxiliaries include soluble and insoluble dyes, inorganic and organic pigments, preferably inorganic pigments, optical brighteners, surface-active substances, anti-foaming agents, bitumen emulsions, thickeners such as alginates, cellulose or starch ethers or ester, plasticisers, fillers such as kaolin, bentonite, talcum, mica, chalk, stabilisers such as casein, gelatin, polyvinyl alcohol, ammonium salts of polyacrylic acid, reactant resins such as aminoplast and phenoplast condensates, colophony resins or abietic acid or their conversion products, curable epoxy condensates, insecticides, fungicides, bactericides and, optionally, anti-agers and adhesion promoters. An alkalimetal salt such as sodium benzoate or sodium nitrite may also be added if desired in order to inhibit flash-rusting.

Suitable inorganic pigments, which may be used individually or in admixture, include for example kaolin, satin white ($3CaO \cdot Al_2O_3 \cdot 3CaSO_4 \cdot 31H_2O$), barium sulphate, white lead, calcium carbonate, zinc oxide, zinc sulphide, titanium dioxide, cadmium sulphide iron oxides and antimony oxide.

In the process according to the invention, the copolymer emulsions are applied to the metal surfaces by dipping, coating, spraying, flooding, knife-coating or similar processes. The surfaces are then dried by the usual methods, preferably at room temperature (18 to 25° C.), or if desired for the sake of speed, at elevated temperatures, for example in the range from 25° C. to 120° C. After normal drying at room temperature, the dried coating is ready for use without any need for post-condensation at elevated temperatures, or may be further processed, i.e. is insoluble in organic solvents and can be wet ground irrespective of the pH value of the copolymer emulsion or mixture applied. Subsequent heat treatment is of course possible in principle, even at elevated temperatures, although the particular advantage of the copolymer emulsions according to the invention is that there is no need to apply such high temperatures and that they are not in any way affected by the pH value of the liquor applied.

The metal coatings thus produced may be used either as single-layer or as multi-layer systems. In the case of multi-layer systems, the coatings may be combined as required with any other lacquer systems.

The coatings are absolutely weather-resistant and do not yellow. Despite their extreme hardness, they are very tough and elastic. One particularly surprising property is their outstanding bond strength to zinc or zinc-plated sheet metal so that they may also be used as adhesion promoters for other lacquer systems on metal surfaces. In addition, they are absolutely resistant to fats and oils, even at elevated temperature, which is of primary importance in many industrial applications.

The parts indicated in the following examples are parts by weight unless otherwise stated.

EXAMPLE 1

10 parts of water, 0.8 part of a condensation product of naphthalene sulphonic acid and formaldehyde, 0.5 part of dibutyl phthalate, 9 parts of talcum, 4 parts of strontium chromate, 12.5 parts of titanium dioxide, 7.0 parts of mica, 1.5 parts of iron oxide black, 4.3 parts of sodium aluminum silicate and 0.4 part of sodium benzoate, are made into a paste and added to 50 parts of a 43% by weight aqueous copolymer emulsion, as described below. The mixture is ground by conventional methods on a three-roll stand and applied to a zinc-plated sheet or iron. The coated surface can be directly painted over and wet ground after a drying time of 30 to 45 mins. at room temperature and in addition to outstanding adhesiveness shows extreme toughness and elasticity coupled with a high resistance to oils and fats. The copolymer emulsion used was prepared as follows:

A solution is prepared at room temperature by mixing 18,525 parts of butyl acrylate, 8,125 parts of acrylonitrile, 3,250 parts of methyl methacrylate, 1,600 parts of methacrylamidomethylcarbamic acid ethyl ester and 1,000 parts of methacrylic acid, 24,200 parts of water, 325 parts of a 10% by weight aqueous solution of a sodium salt of a paraffin sulphonic acid with 12 to 18 carbon atoms and 6,750 parts of the above monomer solution, are introduced into a VA autoclave equipped with stirring mechanism. Air is then displaced from the autoclave whose contents are heated, with stirring, to 70° C. Polymerisation is initiated by the addition of 97.5 parts of sodium pyrosulphite in 2,500 parts of water and 195 parts of potassium persulphate in 2,500 parts of water.

12,700 parts of water and 325 parts of a 10% by weight aqueous solution of a sodium salt of paraffin sulphonic acid containing 12 to 18 carbon atoms, and the rest of the monomer solution, are meanwhile dispersed by stirring in a VA receiver.

16.25 parts of potassium persulphate dissolved in 250 parts of water are then added to the prepolymer, after which the already prepared dispersion is pumped in over a period of three hours. After the dispersion has been pumped in, stirring is continued for another 4 to 6 hours, resulting in the formation of an about 43% by weight copolymer emulsion which, after cooling, is adjusted with ammonia to pH 8.5.

EXAMPLE 2

10 parts of water, 0.8 part of a condensation product of naphthalene sulphonic acid and formaldehyde, 0.5 part of dibutyl phthalate, 9 parts of talcum, 4 parts of strontium chromate, 12.5 parts of zinc sulphide/barium sulphate, 8.5 parts of mica, 4.3 parts of sodium aluminum silicate and 0.4 part of sodium benzoate, are made into a paste as described above and ground with the copolymer emulsion described in Example 1. The coating, prepared from the mixture on sheet iron is dried for 5 to 10 minutes at 50–60° C. and after drying for 30 minutes at room temperature, shows outstanding adhesiveness and elasticity and can be wet-ground. It is resistant to oils and fat.

EXAMPLE 3

The paste of Example 1 is ground with 50 parts of a copolymer emulsion prepared as follows:

A solution is prepared by mixing at room temperature from 16,500 parts of butyl acrylate, 10,500 parts of styrene, 1,500 parts of methacrylic acid and 1,500 parts of methacrylamidomethylene carbamic acid methyl ester. 33,000 parts of water, 90 parts of sodium salt of a fatty acid sulphate containing 12 to 18 carbon atoms in the fatty acid chain and 6,200 parts of the above monomer solution, are introduced into a VA autoclave equipped with stirring mechanism. The air-free autoclave is then heated while stirring to 70° C. Polymerisation is initiated by the addition of 90 parts of sodium pyrosulphite dissolved in 400 parts of water, and 180 parts of potassium persulphate dissolved in 4,500 parts of water. Following prepolymerisation, 45 parts of potassium sulphate in 1,000 parts of water are added, and the residual monomers are pushed in over a period of 3 hours. Stirring for a further 6 hours yields an about 43% by weight aqueous copolymer emulsion which is adjusted with ammonia to pH 8.5.

By applying the above mixture to sheet iron in a layer thickness of 25–40µ, outstanding anti-corrosion properties of the highly elastic, high-bond coating are obtained after drying for 45 minutes at room temperature. The coatings are resistant to oils and fats. Conventional lacquer systems such as alkyd-melamine stoving lacquers, chlorinated rubber lacquers, Desmodur-Desmophen or air-drying alkyd resins, bond very firmly to the air-dried primer coating.

EXAMPLE 4

A copolymer emulsion prepared as follows is used in place of the copolymer emulsion described in Example 1:

9,000 parts of ethyl acrylate, 6,600 parts of butyl acrylate, 10,500 parts of methyl methacrylate, 900 parts of methacrylamide, 1,500 parts of methacrylic acid and 1,500 parts of acrylamidomethylene carbamic acid phenyl ester are mixed at room temperature. 3,300 parts of water, 150 parts of a sodium salt of a fatty alcohol sulphate with 12 to 18 carbon atoms and 6,000 parts of the aforementioned monomers, are introduced into an autoclave, the mixture is heated while stirring to 70° C. and polymerisation is initiated by the addition of 45 parts of sodium pyrosulphite and 150 parts of potassium persulphate dissolved in 5,000 parts of water. Following prepolymerisation the residual monomers are added over a period of three hours and stirring is continued for another 5 hours at 70° C., yielding an about 43% by weight copolymer dispersion.

The copolymer dispersion is mixed with pigments as described in Example 1, paragraph 1, and applied to sheet steel. After drying for 45 minutes the coatings can be wet ground and show an outstanding bond strength coupled with a high resistance both to light and to weathering. In addition, the coatings are resistant to oils and fats.

EXAMPLE 5

A copolymer emulsion prepared as follows is used in place of the copolymer emulsion described in Example 1:

15,000 parts of water, 50 parts of sodium sulphate, 500 parts of a condensation product of oleyl alcohol and ethylene oxide, 500 parts of methacrylamido-methylene carbamic acid isopropyl ester, 150 parts of methacrylamide, 1 part of ferrous sulphate, 10 parts of sodium pyrophosphate and a solution of 50 parts of tert.-dodecyl mercaptan in 5,850 parts of styrene, are introduced into a VA autoclave. Air is then displaced from the autoclave, and the mixture cooled while stirring to 10° C. 3,500 parts of butadiene are then introduced under pressure and the mixture is activated by the addition of 10 parts of sodium hydroxymethyl sulphinate and 25 parts of cumene hydroperoxide. After 20 hours, an about 40% by weight aqueous copolymer emulsion is obtained which is adjusted to pH 8.5 by the addition of ammonia.

The copolymer dispersion is mixed with pigments as in Example 1. After drying for 30 minutes at room temperature, the coating shows outstanding adhesiveness, toughness and elasticity. It can be wet ground and is resistant to oils and fats.

What is claimed is:

1. A metal surface bonded with a cross-linked copolymer consisting essentially of
   (a) 0.1 to 50% by weight, based on the total monomers, of at least one monomer of the formula

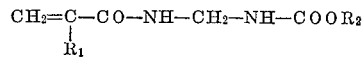

$$CH_2=C-CO-NH-CH_2-NH-COOR_2$$
$$\quad\ |$$
$$\quad R_1$$

wherein $R_1$ is hydrogen or methyl and $R_2$ is alkyl having 1 to 6 carbon atoms, cycloalkyl having 5 to 7 carbon atoms, phenyl alkyl having 1 to 3 carbon atoms in the alkyl moiety, phenyl or naphthyl;
   (b) at least 25% by weight, based on the total monomers, of at least one monomer with an elasticizing action which is a conjugated 1,3-diolefin having 4 to 6 carbon atoms, an ester of acrylic acid with an alcohol having 1 to 18 carbon atoms or an ester of methacrylic acid with an alcohol having 4 to 18 carbon atoms and
   (c) 0 to 70% by weight, based on the total monomers, of at least one further monomer capable of polymerizing with monomers (a) and (b) which is a methacrylic ester with an alcohol having 1 to 3 carbon atoms, vinyl acetate, vinyl propionate, vinyl benzoate, vinyl-n-butyl ether, ethylene propylene, vinyl chloride, 1,1-dichloroethane, styrene, α-methyl styrene, vinyl toluene, acrylic acid, methacrylic acid, acrylamide, methacrylamide, acrylonitrile, 2-hydroxyethyl methacrylate, 2-hydroxypropyl acrylate, 2-aminoethyl methacrylate hydrochloride, 2-dimethylaminomethacrylate or 2-vinyl pyridine.

2. The bonded metal surface of claim 1 wherein monomer (c) is styrene, acrylonitrile, methyl methacrylate, vinyl acetate, acrylamide, methacrylamide, acrylic acid, methacrylic acid or a mixture thereof.

3. The bonded metal surface of claim 1 wherein monomer (a) is present in an amount of from 1 to 20% by weight, based on the total monomers.

4. The bonded metal surface of claim 1 wherein monomer (b) is a conjugated 1,3-diolefin having 4 to 6 carbon atoms and is present in an amount of from 35 to 45% by weight, based on the total monomers.

5. The bonded metal surface of claim 1 wherein monomer (b) is an ester of acrylic acid with an alcohol containing 1 to 18 carbon atoms and is present in an amount of from 45 to 60% by weight, based on the total monomers.

6. The bonded metal surface of claim 1 wherein monomer (b) is an ester of methacrylic acid with an alcohol containing 4 to 18 carbon atoms and is present in an amount of from 45 to 80% by weight, based on the total monomers.

7. The bonded metal surface of claim 1 wherein monomer (b) is 1,3-butadiene, 2-methyl-1,3-butadiene, 2-chloro-1,3-butadiene, 2,3 - dimethyl - 1,3 - butadiene, methyl acrylate, ethyl acrylate, isopropyl acrylate, butyl acrylate, 2-ethylhexyl acrylate, decyl acrylate, octadecyl acrylate, butylmethacrylate, 2 - ethylhexylmethacrylate, dodecyl methacrylate or octadecyl methacrylate.

References Cited

UNITED STATES PATENTS

| | | | |
|---|---|---|---|
| 2,022,233 | 11/1935 | Ellis | 260—479 X |
| 2,862,836 | 12/1958 | Dosterhout | 117—132 X |
| 3,061,595 | 10/1962 | Dorion | 260—80.73 X |
| 3,079,434 | 2/1963 | Christenson | 260—80.73 X |
| 3,163,615 | 12/1964 | Sekmakas | 117—132 X |
| 3,240,740 | 3/1966 | Knapp | 260—80.73 X |
| 3,255,139 | 6/1966 | Dinges | 260—80.73 X |
| 3,314,909 | 4/1967 | Whitfield | 260—80.73 X |
| 3,347,700 | 10/1967 | Glover | 117—132 X |

FOREIGN PATENTS

| | | |
|---|---|---|
| 1,034,945 | 7/1966 | Great Britain. |
| 1,330,053 | 7/1962 | France. |
| 1,030,430 | 6/1953 | France. |
| 1,410,438 | 8/1965 | France. |

OTHER REFERENCES

Hoaben Weyl, Methoden der Organischer Chemie, 4. Auflage, 1963, Bd 14/2, p. 371.

WILLIAM D. MARTIN, Primary Examiner

W. R. TRENOR, Assistant Examiner

U.S. Cl. X.R.

260—80.73, 479